(12) United States Patent
Shao et al.

(10) Patent No.: US 8,259,647 B2
(45) Date of Patent: Sep. 4, 2012

(54) SYSTEM AND METHOD FOR WIRELESS COMMUNICATION OF UNCOMPRESSED VIDEO HAVING A LINK CONTROL AND BANDWIDTH RESERVATION SCHEME FOR CONTROL/MANAGEMENT MESSAGE EXCHANGES AND ASYNCHRONOUS TRAFFIC

(75) Inventors: Huai-Rong Shao, San Jose, CA (US); Harkirat Singh, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 823 days.

(21) Appl. No.: 11/711,302

(22) Filed: Feb. 27, 2007

(65) Prior Publication Data
US 2007/0286130 A1    Dec. 13, 2007

Related U.S. Application Data

(60) Provisional application No. 60/813,153, filed on Jun. 12, 2006.

(51) Int. Cl.
*H04W 4/00* (2009.01)
*H04B 7/216* (2006.01)

(52) U.S. Cl. ......... 370/328; 370/336; 370/338; 370/342

(58) Field of Classification Search .................. 370/336, 370/338, 342, 328
See application file for complete search history.

(56) References Cited

U.S. PATENT DOCUMENTS

| 5,231,494 | A |   | 7/1993  | Wachob    |         |
|-----------|---|---|---------|-----------|---------|
| 5,436,905 | A | * | 7/1995  | Li et al. | 370/346 |
| 5,475,716 | A |   | 12/1995 | Huang     |         |
| 5,943,327 | A | * | 8/1999  | Mademann  | 370/329 |

(Continued)

FOREIGN PATENT DOCUMENTS

EP    1104141 A2    5/2001

(Continued)

OTHER PUBLICATIONS

IEEE 802.11, Standard for Information Technology—Telecommunications and Information Exchange between Systems—Local and Metropolitan Area Networks—Specific requirements Part 11: Wireless LAN Medium Access Control (MAC) and Physical Layer (PHY) Specifications—2007 (Revision of IEEE Std 802.11-1999).

(Continued)

*Primary Examiner* — Nathan Mitchell
(74) *Attorney, Agent, or Firm* — Kenneth L. Sherman, Esq.; Michael Zarrabian, Esq.; Sherman & Zarrabian LLP

(57) ABSTRACT

A system and method for performing medium access control in a system for wireless communication of uncompressed video is disclosed. In one aspect, the method includes communicating a control initiation request message during a contention based period of a superframe period. The control initiation request message contains information allowing a device coordinator to determine a reserved time slot for communication of the requested message exchange. The requested message exchange is then performed in a non-contentious environment, thereby limiting collisions of contention based messages. The control initiation procedure and subsequent message exchanges take place on a low-rate channel. Transmission on the low-rate channel is time division duplexed with a high-rate channel, where transmission at any one time can take place on either the high-rate or the low-rate channel.

39 Claims, 9 Drawing Sheets

U.S. PATENT DOCUMENTS

| | | | |
|---|---|---|---|
| 6,526,036 B1 | 2/2003 | Uchida et al. | |
| 6,532,224 B1* | 3/2003 | Dailey | 370/337 |
| 6,594,238 B1* | 7/2003 | Wallentin et al. | 370/252 |
| 6,826,183 B1 | 11/2004 | Itoi | |
| 6,842,460 B1* | 1/2005 | Olkkonen et al. | 370/465 |
| 6,944,148 B1* | 9/2005 | Gehring et al. | 370/347 |
| 6,980,541 B2* | 12/2005 | Shvodian | 370/346 |
| 7,031,249 B2 | 4/2006 | Kowalski | |
| 7,075,943 B2 | 7/2006 | Bahl | |
| 7,088,702 B2 | 8/2006 | Shvodian | |
| 7,110,783 B2* | 9/2006 | Bahl et al. | 455/516 |
| 7,120,126 B2* | 10/2006 | Odman et al. | 370/252 |
| 7,136,929 B2 | 11/2006 | Koprivica | |
| 7,184,767 B2* | 2/2007 | Gandolfo | 455/435.2 |
| 7,245,628 B2 | 7/2007 | Shi et al. | |
| 7,280,518 B2 | 10/2007 | Montano et al. | |
| 7,630,403 B2 | 12/2009 | Ho et al. | |
| 7,647,599 B2* | 1/2010 | Khawand | 719/328 |
| 2001/0019542 A1* | 9/2001 | Diachina et al. | 370/329 |
| 2001/0055322 A1 | 12/2001 | Domon | |
| 2002/0027959 A1* | 3/2002 | Haim | 375/297 |
| 2002/0059614 A1 | 5/2002 | Lipsanen et al. | |
| 2002/0061024 A1 | 5/2002 | Malkemes et al. | |
| 2003/0063619 A1* | 4/2003 | Montano et al. | 370/443 |
| 2003/0174243 A1 | 9/2003 | Arbeiter | |
| 2003/0179769 A1* | 9/2003 | Shi et al. | 370/442 |
| 2004/0072573 A1* | 4/2004 | Shvodian | 455/450 |
| 2004/0203973 A1* | 10/2004 | Khan | 455/517 |
| 2004/0215766 A1* | 10/2004 | Haddad | 709/224 |
| 2005/0002362 A1* | 1/2005 | Kim et al. | 370/336 |
| 2005/0002525 A1 | 1/2005 | Alkove et al. | |
| 2005/0083896 A1* | 4/2005 | Hong et al. | 370/338 |
| 2005/0135611 A1 | 6/2005 | Hardacker | |
| 2005/0220145 A1 | 10/2005 | Nishibayashi et al. | |
| 2005/0226222 A1 | 10/2005 | Qian et al. | |
| 2005/0238016 A1 | 10/2005 | Nishibayashi et al. | |
| 2006/0018332 A1 | 1/2006 | Kakani et al. | |
| 2006/0067416 A1* | 3/2006 | Tirkkonen et al. | 375/260 |
| 2006/0078001 A1 | 4/2006 | Chandra et al. | |
| 2006/0088048 A1* | 4/2006 | Bahl | 370/458 |
| 2007/0014369 A1* | 1/2007 | Santhoff et al. | 375/240.27 |
| 2007/0130613 A1 | 6/2007 | Choi | |
| 2007/0147284 A1 | 6/2007 | Sammour et al. | |
| 2007/0168822 A1 | 7/2007 | Vitebsky et al. | |
| 2007/0223527 A1 | 9/2007 | Shao et al. | |
| 2007/0230338 A1* | 10/2007 | Shao et al. | 370/230 |
| 2007/0286107 A1 | 12/2007 | Singh et al. | |
| 2008/0045153 A1 | 2/2008 | Surineni et al. | |
| 2008/0098274 A1 | 4/2008 | Kwon et al. | |
| 2008/0130741 A1 | 6/2008 | Chiang et al. | |
| 2008/0192726 A1 | 8/2008 | Mahesh et al. | |

FOREIGN PATENT DOCUMENTS

| | | | |
|---|---|---|---|
| EP | 1589704 A2 | 10/2005 | |
| EP | 1624618 A1 | 2/2006 | |
| WO | WO 2004/100438 A2 | 11/2004 | |
| WO | 2007025560 A1 | 3/2007 | |

OTHER PUBLICATIONS

International Search Report and Written Opinion for PCT/KR2007/003154 dated Dec. 14, 2007, 9 pages.

International Search Report dated Dec. 18, 2007 for PCT/KR2007/002437, filed May 18, 2007.

MBOA, Distributed Medium Access Control (MAC) for wireless networks, WiMedia Alliance, Draft 0.99, Nov. 1, 2005.

Maruhashi, et al., "Wireless uncompressed-HDTV-signal transmission system utilizing compact 60-GHz-band transmitter and receiver," Microwave Symposium Digest, 2005 IEEE MTT-S International, Jun. 12-17, 2005.

U.S. Office Action dated Jul. 6, 2009 in U.S. Appl. No. 11/724,419, filed Mar. 14, 2007.

High Definition Multimedia Interface (HDMI) Specifications version 1.2, Aug. 22, 2005.

IEEE Std. 802.15.3, "Wireless Medium Access Control (MAC) and Physical Layer (PHY) Specification for High Rate Wireless Personal Areas Networks (WPANs)," 2003.

U.S. Office Action dated Dec. 4, 2009 in U.S. Appl. No. 11/725,859, filed Mar. 20, 2007.

Caetano, Lianne, SiBEAM—60 GHz Architecture for Wireless Video Display, SiBEAM, Inc. White Paper, Mar. 2006, [Available online: http://www.sibeam.com/whtpapers/60_GHz_for_WirelessHD_3_06.pdf], pp. 1-6.

NEC develops compact millimeter-wave transceiver for uncompressed HDTV signal transmission, NE Asia Online, Apr. 5, 2005, (Downloaded from http://neasia.nikkeibp.com/topstory/000913 on Sep. 29, 2006).

Notice of Allowance dated Apr. 15, 2010 in U.S. Appl. No. 11/725,859, filed Mar. 20, 2007.

IEEE Draft P802.15.3/D16, "Draft Standard for Telecommunications and Information Exchange Between Systems—LAN/MAN Specific Requirements—Part 15.3: Wireless Medium Access Control (MAC) and Physical Layer (PHY) Specifications for High Rate Wireless Personal Area Networkers (WPAN)," LAN/MAN Standard Committee of the IEEE Computer Society, Feb. 2003, pp. 1-362, United States.

European Office Action dated Nov. 4, 2010 for European Application No. 07746585.4 from European Patent Office, pp. 1-6, Netherlands.

European Search Report dated Oct. 1, 2010 for European Application No. 07746585.4 from European Patent Office, pp. 1-3, The Hague, Netherlands.

Chinese Office Action dated Jul. 14, 2011 for Chinese Patent Application No. 200780052146.9 from Chinese Patent Office, pp. 1-3, Beijing, People's Republic of China [Machine-generated English-language translation attached, 5 p.].

European Invitation Pursuant to Rule 62a(1) EPC dated May 10, 2011 for European Application No. 07768525.3 from European Patent Office, pp. 1-2, Munich, Germany.

Mexican Office Action dated Nov. 17, 2010 for Mexican Patent Application No. MX/a/2009009781 from the Mexican Industrial Property Office, pp. 1-2, Mexico [Machine-generated English-language translation attached, 3 p.].

Mexican Notice of Allowance dated Feb. 3, 2011 for Mexican Patent Application No. MX/a/2009009781 from the Mexican Industrial Property Office, p. 1, Mexico [Machine-generated English-language translation attached, 2 p.].

Korean Office Action dated Oct. 19, 2010 issued in Korean Patent Application No. 10-2009-7005570, pp. 1-3, Korean Intellectual Property Office, Seo-gu, Daejeon, Republic of Korea [Machine-generated English-language translation attached, 3 p.].

Korean Office Action dated Jun. 28, 2011 issued in Korean Patent Application No. 10-2009-7005570, pp. 1-3, Korean Intellectual Property Office, Seo-gu, Daejeon, Republic of Korea [Machine-generated English-language translation attached, 2 p.].

* cited by examiner

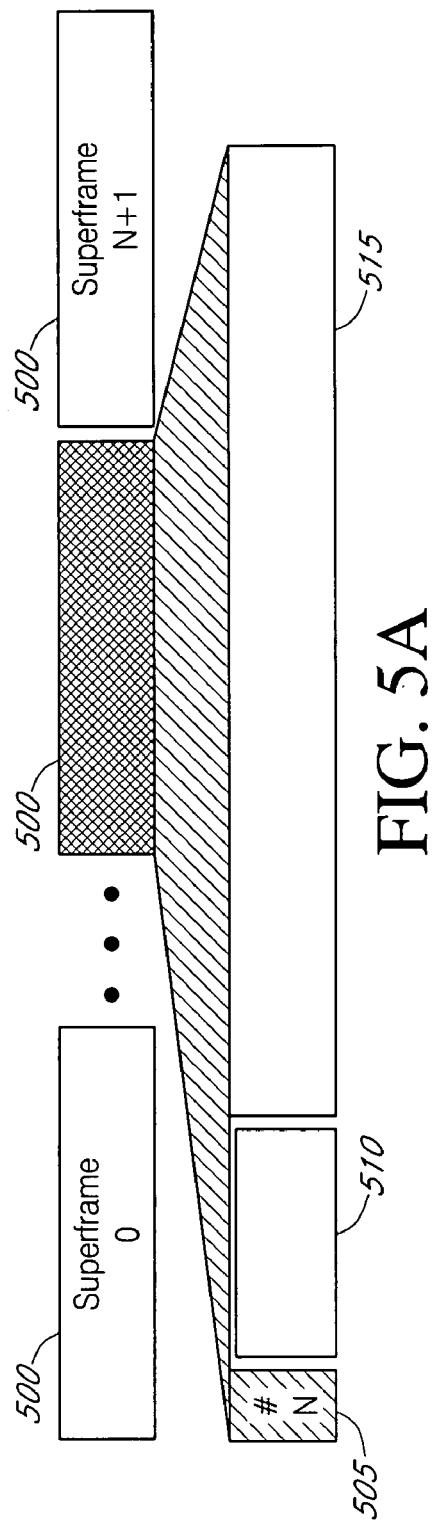
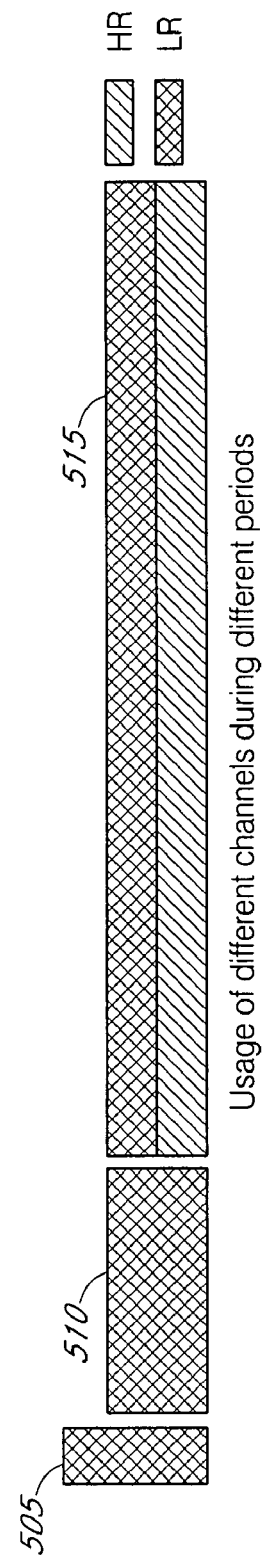
FIG. 5A
FIG. 5B

SYSTEM AND METHOD FOR WIRELESS COMMUNICATION OF UNCOMPRESSED VIDEO HAVING A LINK CONTROL AND BANDWIDTH RESERVATION SCHEME FOR CONTROL/MANAGEMENT MESSAGE EXCHANGES AND ASYNCHRONOUS TRAFFIC

CROSS-REFERENCE TO RELATED APPLICATIONS

This application claims priority from U.S. Provisional Patent Application Ser. No. 60/813,153, entitled "Link control and bandwidth reservation mechanism for low-rate channel of WirelessHD Wireless Video Area Network (WVAN)", filed Jun. 12, 2006, which is incorporated herein by reference in its entirety.

BACKGROUND OF THE INVENTION

1. Field of the Invention

The present invention relates to wireless transmission of video information, and in particular, to transmission of uncompressed high definition video information over wireless channels.

2. Description of the Related Technology

With the proliferation of high quality video, an increasing number of electronic devices, such as consumer electronic devices, utilize high definition (HD) video which can require about 1 Gbps (bits per second) or more in bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be lost and the picture quality can be reduced.

The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD video signals. Wireless local area network (WLAN) and similar technologies can suffer interference issues when several devices that do not have the bandwidth to carry the uncompressed HD signals are connected to the network.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the sample features of this invention provide advantages that may include faster channel acquisitions, improved error recovery and improved efficiency.

One aspect is a method of performing medium access control in a system for wireless communication of uncompressed video, wherein the system comprises a high rate channel and a low rate channel. The method of this aspect includes receiving a control initiation request message over the low rate channel from a client device, determining at least one time slot for communication of control messages associated with the client device within a superframe period of a predetermined length, and transmitting a message over the low rate channel containing information identifying the at least one determined time slot.

Another aspect is a device for performing medium access control in a system for wireless communication of uncompressed video, wherein the system comprises a high rate channel and a low rate channel. The device of this aspect includes a receiver to receive a control initiation request message over the low rate channel from a client device, a link controller to determine at least one time slot for communication of control messages associated with the client device within a superframe period of a predetermined length, and a transmitter to transmit a message over the low rate channel containing information identifying the at least one determined time slot.

Another aspect is a method of performing medium access control in a system for wireless communication of uncompressed video, wherein the system comprises a high rate channel and a low rate channel. The method of this aspect includes transmitting a control initiation request message over the low rate channel, receiving a plurality of messages over the low rate channel, determining that one of the received messages is a response message associated with the transmitted control initiation request message, the response message containing information identifying at least one reserved time slot within a superframe period, the superframe period being of a predetermined length, and transmitting and/or receiving a control message during the at least one identified time slot of one or more subsequent superframe periods.

Another aspect is a device for performing medium access control in a system for wireless communication of uncompressed video, wherein the system comprises a high rate channel and a low rate channel. The device of this aspect includes a transmitter to transmit a control initiation request message over the low rate channel, a receiver to receive a plurality of messages over the low rate channel, and a medium access controller configured to determine that one of the received messages is a response message associated with the transmitted control initiation request message, the response message containing information identifying at least one reserved time slot within a superframe period, the superframe period being of a predetermined length, where the transmitter transmits and/or the receiver receives a control message during the at least one identified time slot of one or more subsequent superframe periods.

Another aspect is a system for communicating uncompressed video data over a wireless communication link, the wireless communication link including a high rate channel associated with a bandwidth capable of supporting transmission of the uncompressed video data, and a low rate channel associated with a bandwidth smaller than the bandwidth of the high rate channel, wherein frequency bands of the low rate channel and the high rate channel at least partially overlap. The system of this aspect includes a device coordinator including a receiver to receive an initiation request message over the low rate channel during a first period of a superframe period of a predetermined length, a medium access controller to determine a time slot within a second portion of the superframe period for communication of control messages over the low rate channel, and a transmitter to transmit a response message over the low rate channel containing information identifying the determined time slot. The system further includes a client device comprising a transmitter to transmit the control initiation request message over the low rate channel, and a receiver to monitor the low rate channel and to receive the response message, where the transmitter is further configured to transmit a control message during the identified time slot of one or more subsequent superframes in response to receiving the response message containing the reserved time slot information.

BRIEF DESCRIPTION OF THE DRAWINGS

FIG. 5a is an illustration of a sequence of superframes and a breakdown of an example of a superframe time period that may be used in a wireless network such as illustrated in FIG. 1.

FIG. 5b is an illustration of an example of time division duplexing of the low and high rate channels illustrated in FIG. 3 within a superframe period.

DETAILED DESCRIPTION OF CERTAIN INVENTIVE EMBODIMENTS

Certain embodiments provide a method and system for transmission of uncompressed HD video information from a sender to a receiver over wireless channels.

The following detailed description is directed to certain sample embodiments of the invention. However, the invention can be embodied in a multitude of different ways as defined and covered by the claims. In this description, reference is made to the drawings wherein like parts are designated with like numerals throughout.

Embodiments include systems and methods of improving processing in communication devices in a wireless system for communication of uncompressed video data. Video data may include one or more of motion video, still images, or any other suitable type of visual data. Embodiments include apparatus and methods of performing link and/or medium access control of a low-rate channel for communication of control messages. An aspect of these embodiments include using superframes where each superframe includes one or more predefined time frames including a beacon frame for transmission of reserved time slot information to client devices, a control frame for client devices to request reserved time blocks for transmission and/or reception of control messages, and a channel time block (CTB) frame where blocks of time can be reserved for multiple devices on either the low-rate channel or on a high-rate channel for communication of the uncompressed video. In one aspect the control period uses a contention based scheme allowing for multiple devices to transmit requests for reserving channel time blocks.

Figure 1:
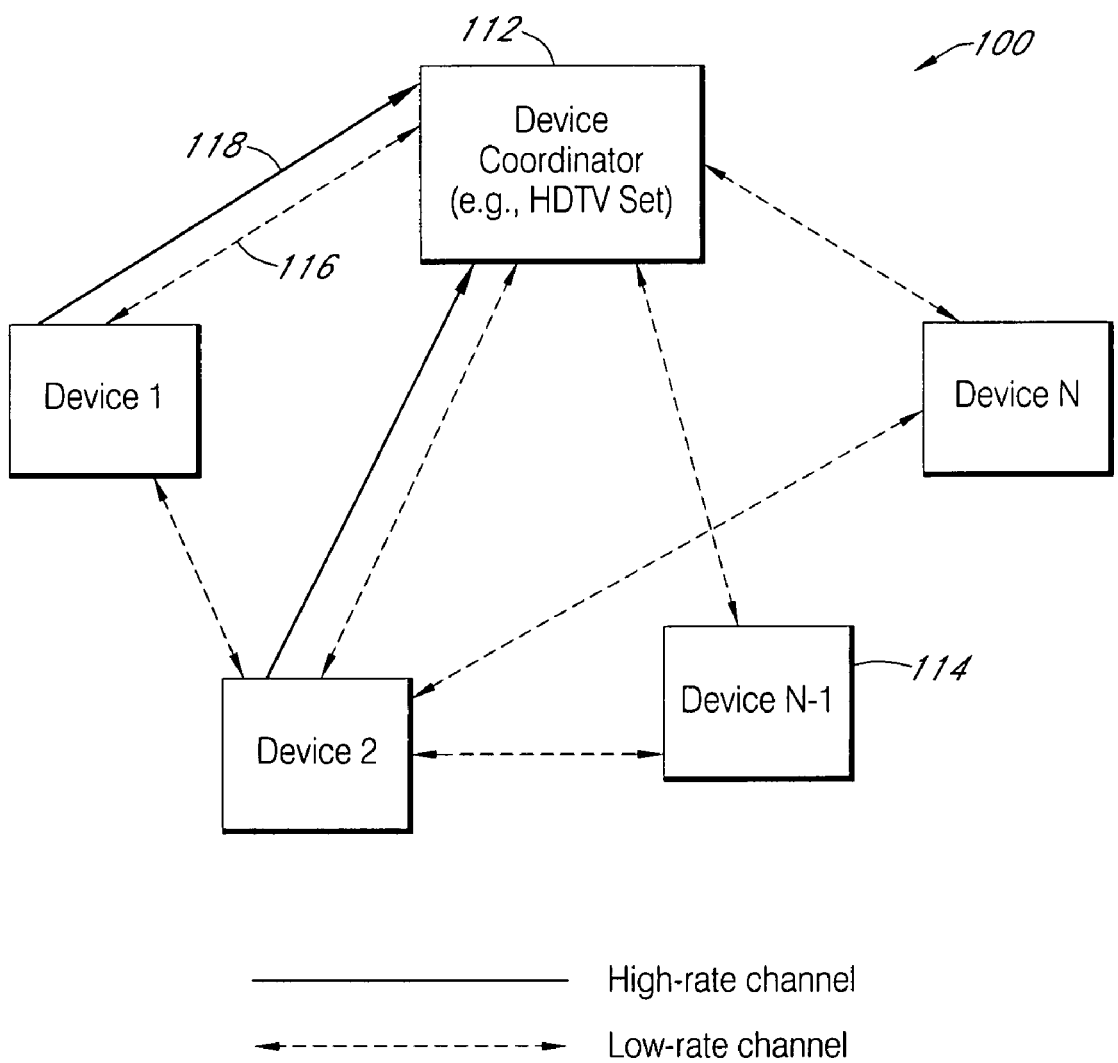
FIG. 1 is a functional block diagram of a wireless network that implements uncompressed HD video transmission between wireless devices according to one embodiment of the system and method.

Example implementations of the embodiments in a wireless high definition (HD) audio/video (A/V) system will now be described. FIG. 1 shows a functional block diagram of a wireless network 100 that implements uncompressed HD video transmission between A/V devices such as an A/V device coordinator and A/V stations, according to certain embodiments. In other embodiments, one or more of the devices can be a computer, such as a personal computer (PC). The network 100 includes a device coordinator 112 and multiple client devices or A/V stations 114 (e.g., Device 1 . . . Device N).

The A/V stations 114 utilize a low-rate (LR) wireless channel 116 (dashed lines in FIG. 1), and may use a high-rate (HR) channel 118 (heavy solid lines in FIG. 1), for communication between any of the devices. The device coordinator 112 uses a low-rate channel 116 and a high-rate wireless channel 118, for communication with the stations 114. Each station 114 uses the low-rate channel 116 for communications with other stations 114. The high-rate channel 118 supports single direction unicast transmission over directional beams established by beamforming, with e.g., multi-GB/s bandwidth, to support uncompressed HD video transmission. For example, a set-top box can transmit uncompressed video to a HD television (HDTV) over the high-rate channel 118. The low-rate channel 116 can support bi-directional transmission, e.g., with up to 40 Mbps throughput in certain embodiments. The low-rate channel 116 is mainly used to transmit control frames such as acknowledgement (ACK) frames. For example, the low-rate channel 116 can transmit an acknowledgement from the HDTV to the set-top box. It is also possible that some low-rate data like audio and compressed video can be transmitted on the low-rate channel between two devices directly. Time division duplexing (TDD) is applied to the high-rate and low-rate channel. At any one time, the low-rate and high-rate channels cannot be used in parallel for transmission, in certain embodiments. Beamforming technology can be used in both low-rate and high-rate channels. The low-rate channels can also support omni-directional transmissions. Details of the low and high-rate channels will be discussed below in reference to FIGS. 3 and 4.

In one example, the device coordinator 112 is a receiver of video information (referred to as "receiver 112"), and the station 114 is a sender of the video information (referred to as "sender 114"). For example, the receiver 112 can be a sink of video and/or audio data implemented, such as, in an HDTV set in a home wireless network environment which is a type of WLAN. The sender 114 can be a source of uncompressed video or audio. Examples of the sender 114 include a set-top box, a DVD player or recorder, a digital camera, a camcorder, and so forth.

Figure 2:
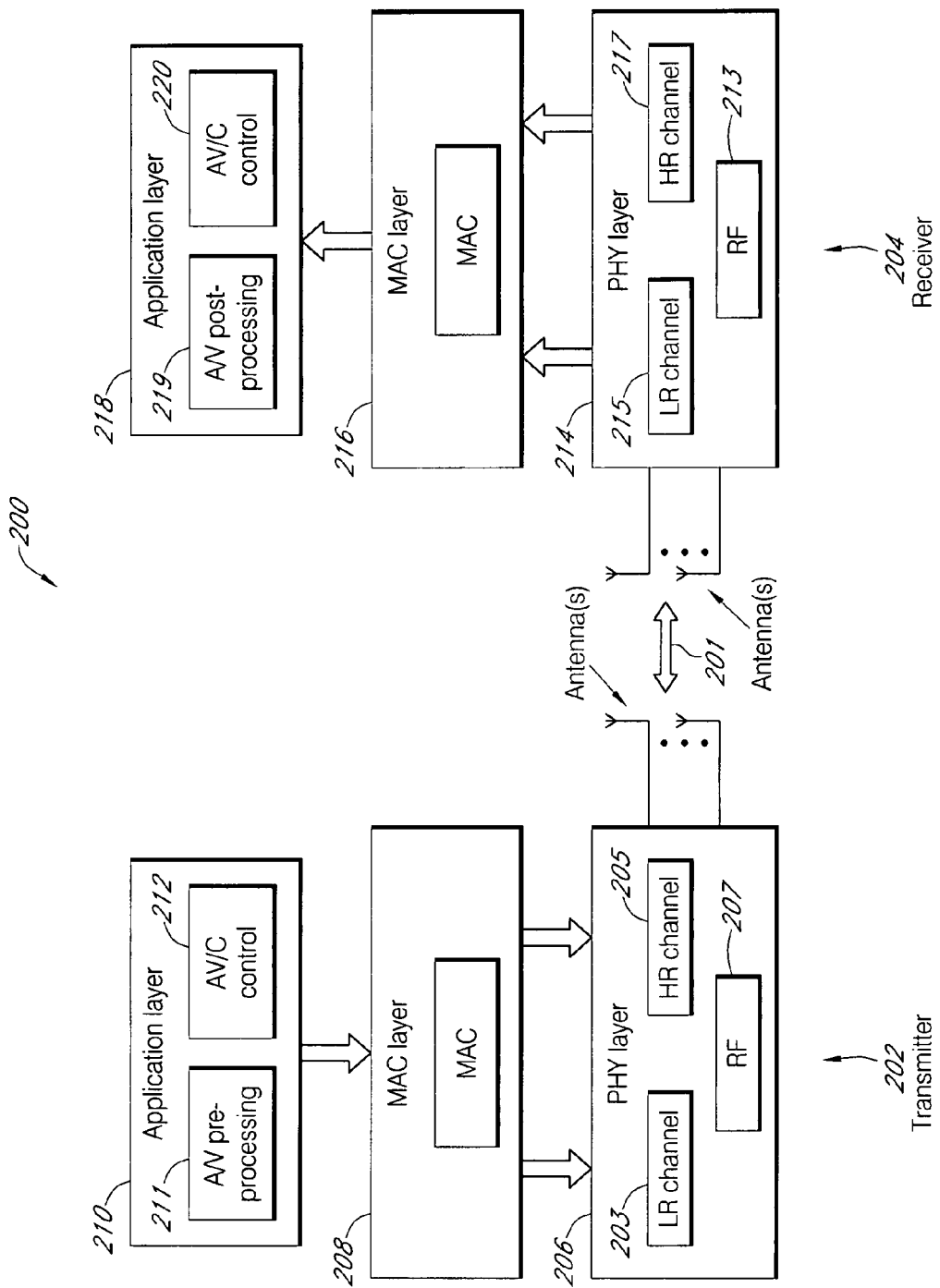
FIG. 2 is a functional block diagram of an example communication system for transmission of uncompressed HD video over a wireless medium, according to one embodiment of the system and method.

FIG. 2 illustrates a functional block diagram of an example communication system 200. The system 200 includes a wireless transmitter 202 and wireless receiver 204. The transmitter 202 includes a physical (PHY) layer 206, a media access control (MAC) layer 208 and an application layer 210. Similarly, the receiver 204 includes a PHY layer 214, a MAC layer 216, and an application layer 218. The PHY layers provide wireless communication between the transmitter 202 and the receiver 204 via one or more antennas through a wireless medium 201.

The application layer 210 of the transmitter 202 includes an A/V pre-processing module 211 and an audio video control (AV/C) module 212. The A/V pre-processing module 211 can perform pre-processing of the audio/video such as partitioning of uncompressed video. The AV/C module 212 provides a standard way to exchange A/V capability information. Before a connection begins, the AV/C module negotiates the A/V formats to be used, and when the need for the connection is completed, AV/C commands are used to stop the connection.

In the transmitter 202, the PHY layer 206 includes a low-rate (LR) channel 203 and a high rate (HR) channel 205 that are used to communicate with the MAC layer 208 and with a radio frequency (RF) module 207. In certain embodiments, the MAC layer 208 can include a packetization module (not shown). The PHY/MAC layers of the transmitter 202 add PHY and MAC headers to packets and transmit the packets to the receiver 204 over the wireless channel 201.

In the wireless receiver 204, the PHY/MAC layers 214, 216 process the received packets. The PHY layer 214 includes a RF module 213 connected to the one or more antennas. A LR channel 215 and a HR channel 217 are used to communicate with the MAC layer 216 and with the RF module 213. The application layer 218 of the receiver 204 includes an A/V post-processing module 219 and an AV/C module 220. The module 219 can perform an inverse processing method of the module 211 to regenerate the uncompressed video, for example. The AV/C module 220 operates in a complementary way with the AV/C module 212 of the transmitter 202.

Figure 3:
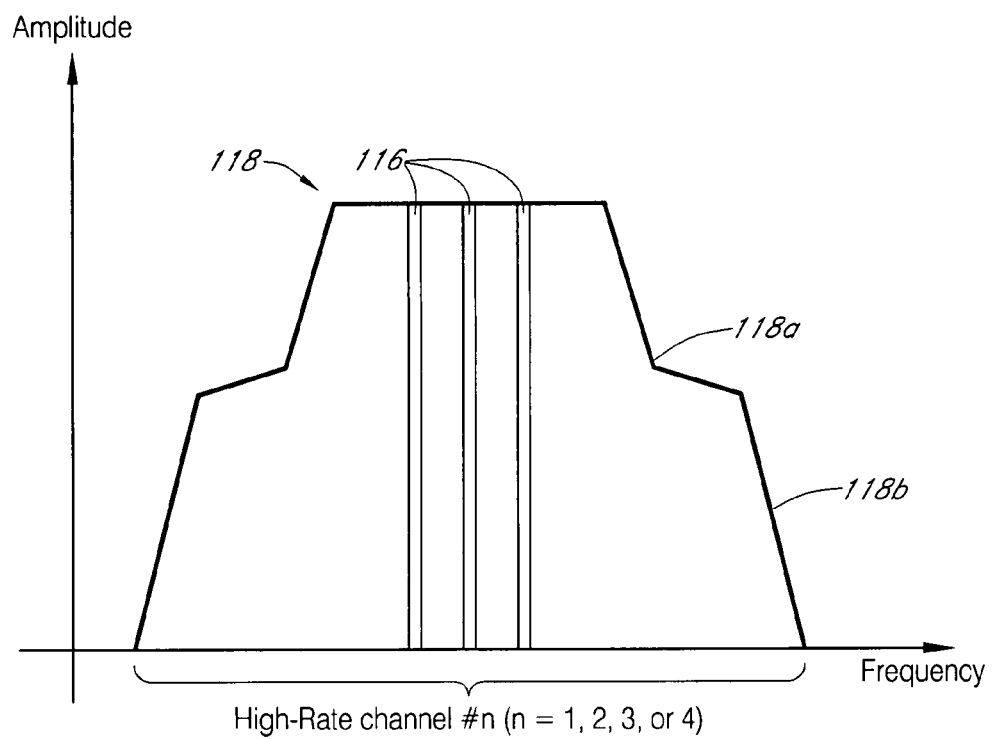
FIG. 3 is a frequency map of an example of overlapping high rate and low rate channels that may be used in a wireless network such as illustrated in FIG. 1.

As discussed above, the frequency bands of the low-rate and high-rate channels overlap. There may be portions of the high-rate channel that may not overlap with a low-rate channel and conversely, there may be portions of a low-rate channel that do not overlap the high-rate channel, depending on the embodiment. FIG. 3 is a frequency map of an example of overlapping high-rate and low-rate channels that may be used in a wireless network such as illustrated in FIG. 1. In this example, three low-rate channels 116 are positioned within a single high-rate channel 118. There can be more or fewer low-rate channels 116 than three as in this example. The low-rate channels 116 may have a bandwidth in a range from about 50 MHz. to about 200 Mhz, preferably from about 80 MHz to about 100 Mhz There may also be multiple high-rate channels 118 as indicated by the "channel #n" in FIG. 3. In this example, there are 4 high-rate channels 118. The high-rate channel 118 is shown as having sloping sidebands 118a and 118b. This is done for limiting inter-channel interference between adjacent channels. However, some embodiments may not use sloping sidebands. The low-rate channels 116 may also exhibit sloping sidebands (not shown). The high-rate and low-rate channels may be present in any frequency band. The bandwidth of the high-rate channel used depends on the data rate of the uncompressed video to be communicated. The bandwidth may be large enough to support a data rate in a range from about 1 Gbps to about 4 Gbps. Frequency bands that are used for other wireless systems can be used. The choice of frequency bands may depend on the regulatory agency of the country in which the system is being used. For unlicensed devices, there is allocated frequency spectrum, in the United States for example, for unlicensed devices frequency bands are allocated at 800 MHz, 2.4 GHz, 5 GHz and 60 GHz. In one embodiment, the 60 GHz band is used.

Figure 4B:
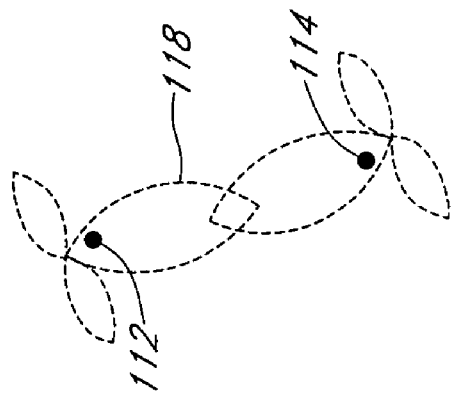
FIGS. 4a and 4b are illustrations of examples of omni-directional and directional channel beams that may be used in a wireless network such as illustrated in FIG. 1.
Figure 4A:
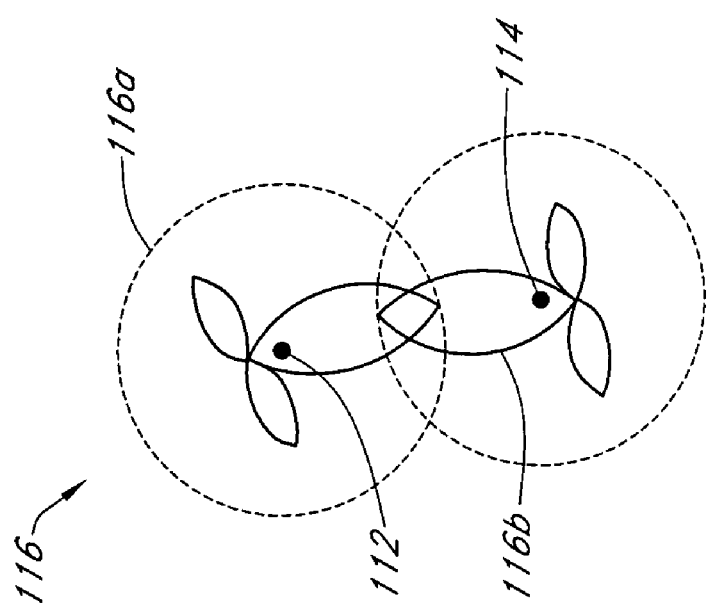

FIGS. 4a and 4b are illustrations of examples of omnidirectional and directional channel beams that may be used in a wireless network such as illustrated in FIG. 1. FIG. 4a depicts a device coordinator 112 communicating with a client device 114 over a low-rate channel 116. The low-rate channel 116 can be used in either an omni-directional mode, as illustrated by the circular coverage areas 116a, or a directional mode, e.g., using beam steering, as illustrated by the narrow beam coverage areas 116b. In either case, the low-rate channel 116 is a symmetric channel where devices transmit and receive information. FIG. 4b depicts a device coordinator 112 and a client device communicating over a high-rate channel 118. The high-rate channel 118 is an asymmetric directional channel as depicted by the narrow beam coverage areas of FIG. 4b. In one embodiment, a directional low rate channel is used in conjunction with the asymmetric directional high rate channel for communication of Acks, etc., from the device coordinator 112 to the client device 114.

In one embodiment, the low-rate channel uses OFDM (orthogonal frequency division multiplexing) in both the omni-directional and directional modes. However, other suitable transmission protocols may be used, including, for example, code division multiple access (CDMA) frequency division multiple access (FDMA) system, time division multiple access (TDMA), frequency hopping, etc. The low-rate channel omni-directional mode is used for transmission of control data such as beacon messages (discussed below), network/device association and disassociation, device discovery, acknowledgements, device capability and preference exchanges, etc. The low rate channel directional or beam-formed mode can be used for communicating audio signals and/or compressed video signals. The low-rate channel directional mode is not as reliable due to frequently changing channel conditions including blockages by objects such as people, furniture, walls, etc. For this reason, the omni-directional mode is used for the majority of control signals since it is more reliable and movement of the receiver and/or transmitter has less effect on the ability to maintain a connection. The low-rate channel omni-directional mode offers data rates in a range from about 2.5 Mbps to about 10 Mbps. The low-rate channel directional mode offers data rates in a range from about 20 Mbps to about 40 Mbps. However, other data rates are envisioned as being possible.

The directional modes of the low-rate and high-rate channels can be used for multiple simultaneous connections between devices since the transmission beams are narrow and may not adversely affect one another. However, the low-rate channel omni-directional transmissions (as depicted by the circular coverage areas 116a in FIG. 4a) can interfere with any device coordinator 112 or client device 114 within range. For this reason, the low-rate channel omni-directional transmissions are time division duplexed with the directional transmissions (both low-rate and high-rate). Time division duplexing of low-rate channel omni-directional transmissions and the high-rate channel directional transmissions will now be discussed.

Many time division duplexing (TDD) channel access control schemes may be used to coordinate transmissions of the low-rate and high-rate channels within a network. The goal of the TDD scheme is to only have one of the two channels, low-rate or high-rate, being used for transmission at any one time. An example of a channel access control scheme used to coordinate the low-rate and high-rate channels is a super-frame-based scheme. FIG. 5a is an illustration of a sequence of superframes and a breakdown of an example of a superframe time period that may be used in a wireless network such as illustrated in FIG. 1. In a superframe base transmission system, the transmission time is broken into a series of superframes 500. The length of time of the superframe is made small enough to allow for frequent medium access control (this cuts down on delays in processing control signals that enable access), but is made long enough to provide for efficient throughput of uncompressed video data. Large delays in processing user commands, such as on/off, channel switch, volume change, etc., will negatively affect the user experience. For these reasons, a superframe time is typically in a range from about 16 msec. to about 100 msec.

In the example superframe scheme shown in FIG. 5a, each superframe is divided into three main time frames, a beacon frame 505, a control period frame 510 and a frame for reserved and unreserved channel time blocks (CTB's) 515. The time frame for reserved and unreserved CTB's is herein referred to as the CTB frame 515. The beacon frame is used to set the timing allocations for the reserved and unreserved CTBs of the CTB frame 515. A device coordinator 112, such as a TV set, for example, communicates reserved time slots to the multiple client devices 114 in a network such as the network 100 in FIG. 1.

The control period frame 510 is used to allow client devices to transmit control messages to a device coordinator. Control messages may include network/device association and disassociation, device discovery, time slot reservations, device capability and preference exchanges, etc. The control period frame 510 may use a contention based access system such as Aloha, slotted Aloha, CSMA (carrier sensed multiple access), etc., to allow multiple devices to send control messages and to handle collisions of messages from multiple devices. When a message from a client device is received at a device coordinator without suffering a collision, the device coordinator can respond to the request of the message in the beacon frame 505 of a subsequent superframe 500. The response may be a time slot reservation of a CTB in one or more subsequent superframes 500.

The CTB frame 515 is used for all other transmissions other than beacon messages and contention based control messages which are transmitted in the beacon frame 505 and the control frame 510. Reserved CTBs are used to transmit commands, isochronous streams and asynchronous data connections. CTB's can be reserved for transmission by a coordinator device to a specific client device, for transmission by a client device to a device coordinator, for transmission by a client device to another client device, etc. A CTB can be used to transmit a single data packet or multiple data packets. A CTB frame can include any number of reserved or unreserved CTB's. Unreserved CTB's in the CTB frame 510 can be used for communication of further contention based commands on the low-rate channel such as remote control commands (e.g., CEC commands), MAC control, and management commands.

It is desirable to make the length of the control frame 510 as small as possible while still allowing many client devices to be able to successfully access the network without undue time delay, e.g., due to message collision. In one embodiment, the only messages that are sent on a contention basis are control initiation request messages that identify a requesting device and a type of message sequence exchange to be scheduled in a reserved CTB. In this way, the size of the messages that are contention based are kept to a minimum. All other message exchanges on the low-rate channel can be scheduled.

In order for a message of a client device to be identified by a receiving device coordinator, a preamble is used at the start of a contention based message. The preamble is a predetermined bit sequence that can be identified by the device coordinator (or any receiving device). In one embodiment, carrier sensing is particularly difficult in the 60 GHz frequency range and the length of the preamble may be in a range from about 50 microseconds to about 75 microseconds. Such long preambles make it very difficult to keep the control frame 510 to a desired short time duration. It can be envisioned that with many client devices, there could be a large number of collisions occurring in the control period 510, especially if the data being communicated is large, such as in a device capability message. Therefore, an efficient method of processing control messages is needed. In embodiments where the preamble is in a range from about 50 microseconds to about 75 microseconds, the length of the control frame 510 may be in a range from about 100 to about 600 microseconds.

FIG. 5b is an illustration of an example of time division duplexing of the low and high rate channels illustrated in FIG. 3 within a superframe period. FIG. 5b shows which channels can be used for transmission in the various superframe subframes shown in FIG. 5a. In one embodiment, the low-rate channel 116 only is used for transmission during the beacon frame 505, and the control frame 510. Both the high-rate and low-rate channels can be used for transmission during the CTB frame 515. Any of the beacon frame 505, the control frame 510 and the CTB frame 515 can have either fixed or variable durations, depending on the embodiment. Likewise, the superframe 500 time duration can be fixed or variable, depending on the embodiment.

Figure 6:
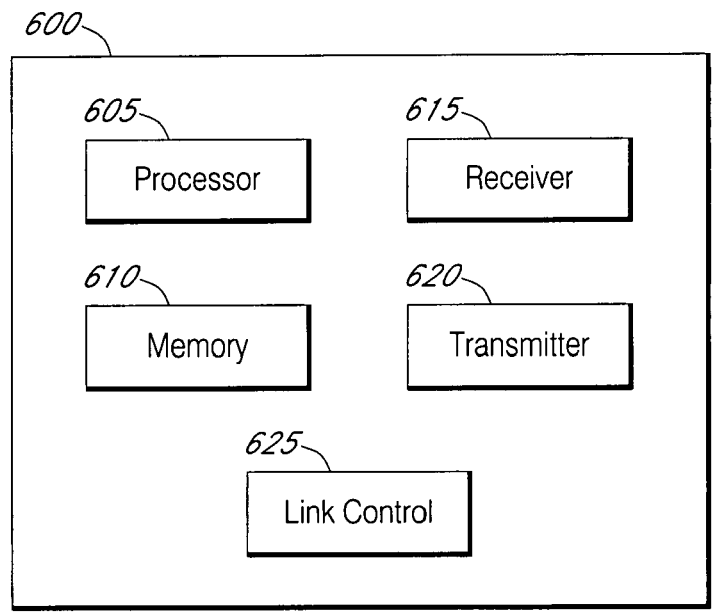
FIG. 6 is a block diagram illustrating an example of a device coordinator that may be used in a wireless network such as illustrated in FIG. 1.

FIG. 6 is a block diagram illustrating an example of a device coordinator that may be used in a wireless network such as illustrated in FIG. 1. In this embodiment, the device coordinator 600 comprises processor element 605, a memory element 610, a receiver element 615, a transmitter element 620, and a link control element 625. The processor 605 may include one or more of a general purpose processor and/or a digital signal processor and/or an application specific hardware processor. The memory 610 may include one or more of solid state or disk based storage or any readable and writeable random access memory device. The processor 605 is coupled to the memory 610 and the other elements to perform the various actions of the other elements. The receiver 615 receives data transmitted by other devices in the network 100, such as the client devices 114. The receiver can be configured to receive data over the low-rate channel 116 and/or the high rate channel 118. The transmitter 620 transmits data over the network 100. The transmitter 620 can be configured to transmit over the low-rate channel only as depicted in the device coordinator 112 in the network 100 of FIG. 1, or to transmit over the high-rate channel 118 as well, for example to a digital video recorder device (not shown).

The link control element 625 determines time slots to reserve for client devices that have requested time on the low-rate and/or high-rate channels. The requests may specify the type of channel that is needed (e.g., the low-rate or the high-rate channel). The requests may indicate a type of control message sequence that is needed, such as a device discovery sequence, a device capability exchange, etc. The time slot reservation request may indicate a type of multimedia bitstream that is to be transmitted, such as an uncompressed 1080i or 1080p HDTV video bitstream, or an audio bitstream, etc. The link control element 625 is configured to determine duration of the reserved time slot needed to complete the requested exchange and to identify where in the superframe period to locate the reserved time slot. The time slot location within the superframe is then encoded into a message to be transmitted to the one or more client devices and/or other device coordinators affected by the time slot reservation request.

In some embodiments, one or more of the elements of the device coordinator 600 of FIG. 6 may be rearranged and/or combined. The elements may be implemented by hardware, software, firmware, middleware, microcode or any combination thereof. Details of the actions performed by the elements of the device coordinator 600 will be discussed in reference to the methods illustrated in FIGS. 8 and 9 below.

Figure 7:
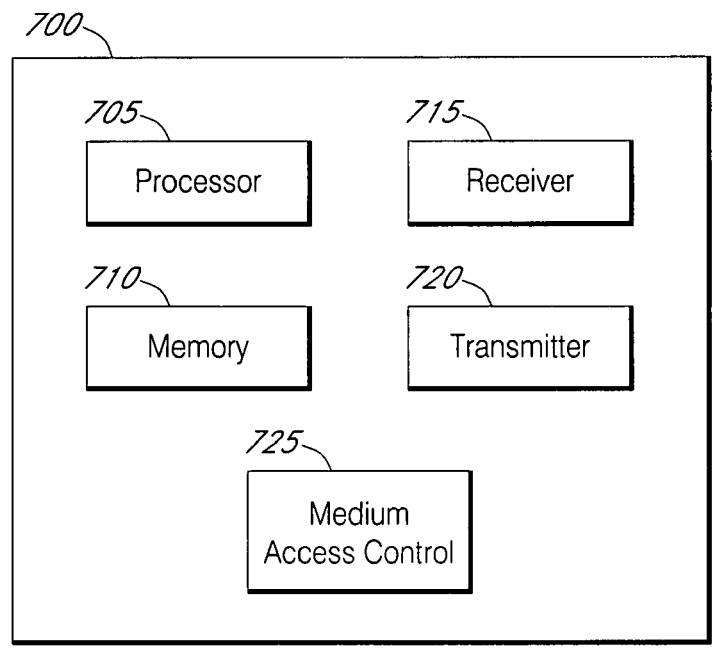
FIG. 7 is a block diagram illustrating an example of a client device that may be used in a wireless network such as illustrated in FIG. 1.

FIG. 7 is a block diagram illustrating an example of a client device that may be used in a wireless network such as illustrated in FIG. 1. In this embodiment, the client device 700 comprises processor element 705, a memory element 710, a receiver element 715, a transmitter element 720, and a medium access control element 725. The processor 705 may include one or more of a general purpose processor and/or a digital signal processor and/or an application specific hardware processor. The memory 710 may include one or more of solid state or disk based storage or any readable and writeable random access memory device. The processor 705 is coupled to the memory 710 and the other elements to perform the various actions of the other elements. The receiver 715 receives data transmitted by other devices in the network 100, such as the device coordinator 112 or other client devices 114. The receiver can be configured to receive data over the low-rate channel 116 and/or the high rate channel 118. The transmitter 720 transmits data over the network 100. The transmitter 720 can be configured to transmit over the low-rate channel only as depicted in the client device labeled Device N in the network 100 of FIG. 1, or to transmit over both the low-rate channel 116 and the high-rate channel 118 as in the client device labeled Device 2.

The medium access control element 725 generates access request messages (e.g., control initiation request messages) to be transmitted to the device coordinator 112 of the network 100. The request messages may be requests for initiation/termination of a control sequence or for initiation/termination of a multimedia bitstream. The medium access control element 725 determines the content of the request message and formats the message with various data fields. The fields may include a preamble, one or more headers one or more data fields and padding bits. The messages may include fixed length or variable length packets and fixed and/or variable length fields within the packets. The medium access control element is also configured to interpret time slot information received from the device coordinator 112. The time slot information indicates reserved time blocks to receive and/or transmit messages and/or multimedia content in future superframes. The medium access control element may also determine the destination device or source device to transmit to or receive from, respectively.

In some embodiments, one or more of the elements of the client device 700 of FIG. 7 may be rearranged and/or combined. The elements may be implemented by hardware, software, firmware, middleware, microcode or any combination thereof. Details of the actions performed by the elements of the client device 700 will be discussed in reference to the methods illustrated in FIGS. 8 and 9 below.

Figure 8:
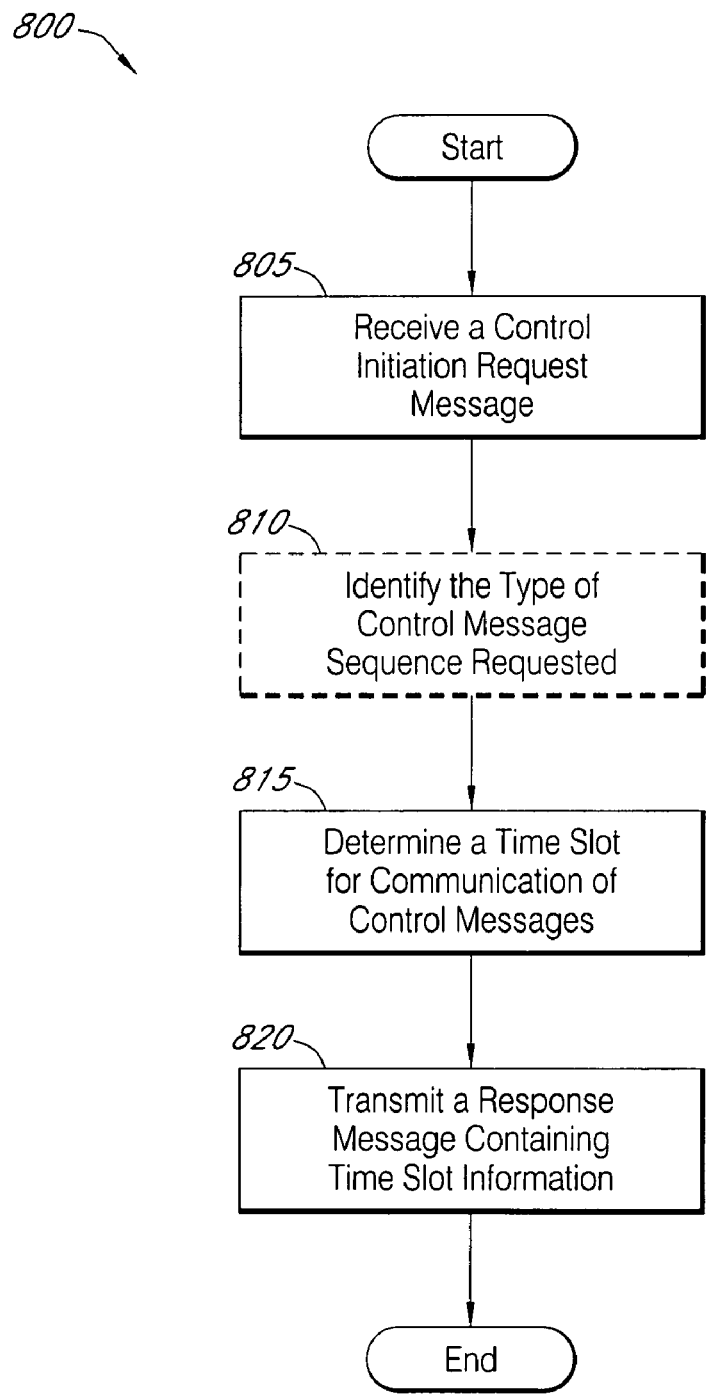
FIG. 8 is a flowchart illustrating an example of a method of performing medium access control in a wireless network such as illustrated in FIG. 1.

FIG. 8 is a flowchart illustrating an example of a method of performing medium access control in a wireless network such as illustrated in FIG. 1. Method 800 includes link control functions that are performed by a device coordinator such as the device coordinator 112 in FIG. 1. The method 800 enables the device coordinator 112 to schedule traffic to and/or from the multiple client devices 114 on the low-rate channel 116 in an efficient manner. By keeping collisions that may occur during contention based access of the low-rate channel to a low level, the throughput on the high-rate channel, which cannot be utilized when the one or more low-rate channels are being utilized, can be increased.

The method 800 starts at block 805 where a control initiation request message is received by the device coordinator 112. The control initiation request message is received over the low rate channel. The control initiation request message can be received during the control frame 510 of the superframe 500 as shown in FIG. 5a. The control frame 510 may be a contention based control period where multiple client devices can transmit control initiation request messages and a collision of multiple messages is possible. The control initiation request message may also be received in an unreserved CTB period of the CTB frame 515 in the superframe 500. The control initiation request message contains information identifying the client device that is requesting the control message exchange. The control initiation request message may also contain information identifying a second device (such as the device coordinator 112 or another client device 114) that the requesting device is requesting to have the message exchange with. The receiver element 615 of the device coordinator 600 shown in FIG. 6 can perform the acts at the block 805.

In some embodiments, the control initiation request message contains information identifying the type of control message exchange sequence that is being requested. In these embodiments, the process 800 continues at optional block 810, where the type of control message exchange sequence being requested is identified. The type of control message exchange sequence may be one of a plurality of message sequences including, but not limited to, network/device association and disassociation, device discovery, time slot reservations, device capability and preference exchanges. The information identifying the requested message exchange sequence may also identify a data rate, a length of time for transmission and/or reception of data, a minimum or maximum time, a minimum or maximum data rate, as well as other types of information known to those of skill in the art that could enable a device coordinator to accurately predict the time slot duration and/or the number of superframe periods needed to support the requested message exchange. The information identifying the type of control message exchange may be a fixed or variable length field in the control initiation request message. For example, the size of the field can be large enough to enable representation of a finite number of possible control message exchanges supported by the network. Say there are 10 possible types of control message sequences supported, then a 4 bit field will allow identification of the 10 possible types. The link control element 625 of the device coordinator 600 shown in FIG. 6 can perform the acts of block 810.

After the device coordinator has received the control initiation request message at block 805, and optionally identified the type of control message sequence requested, the process 800 continues at block 815 where a determination is made of a time slot for communication of the requested control message sequence. The CTB frame 515 of the superframe 500 is used for scheduling transmissions over the high-rate and low-rate channels, where only one or more of the low-rate channels 116 (as shown in FIG. 3) or the overlapping high-rate channel 118 can transmit at any one time. The device coordinator can determine the time slot information based on the information received in the control initiation request message. Depending on what information is contained in the control initiation request message, the device coordinator can make a more knowledgeable determination of the duration of the time slot to be reserved. For example, if the control initiation request message contains no information other than the identity the requesting device, then the device coordinator may determine a default time slot size located in the next available superframe, and continuing for a default number of superframes. The more information that is contained in the control initiation request message, the more knowledgeable the determination that can be made.

In some embodiments, the control initiation request message identifies a type of message exchange that is requested, as discussed above in reference to the optional block 810. In these embodiments, the determination at block 815 can utilize a look-up table listing all the possible message exchanges and the associated time-slot and the number of superframes that support such a message exchange. This type of look-up table can be predetermined based on the known message exchanges. Most control message exchanges comprise a very structured sequence of messages to and from the devices exchanging the messages. For example, a security key exchange for enabling encryption includes very well defined message sequences including queries, responses, public key exchanges, etc. Thus, a look-up table providing the amount of time needed to transmit the number of messages can be made without undue experimentation. This method of allocating time slots to operations of predictable data content and time duration can result in message exchanges being completed in a fixed and predictable time while reducing channel overhead due to reduced collision probability.

In some embodiments, the control initiation request message may contain a minimum data rate (or alternatively a minimum amount of data to be exchanged) needed to support an exchange of data, such as an audio feed. Knowing the data rate, the device coordinator can determine the time slot needed every superframe to support the data rate.

In addition to determining the size of the time slot needed every superframe to support a requested message type and/or requested data rate, a determination where in the superframe 500 to locate the time slot also is made by the device coordinator at block 815. The device coordinator schedules multiple devices in the network to share the available time in the CTB frame 515 of the superframe 500. Thus, the device coordinator avoids allocating a time slot larger than the total unreserved time of the CTB frame for a given superframe. For example, if the CTB frame of a 20 msec. superframe comprises 17.5 msec. and already scheduled CTB's account for 15 msec., then only 2.5 msec. are available for a requested message exchange. If the required time slot duration of the requested message type and/or data rate is not met by the 2.5 msec. time slot available, then the device coordinator can wait until the unreserved CTB time exceeds the needed level before responding to the request. Alternatively, if there is not enough unreserved CTB time available for a request, the device coordinator may transmit a response message indicating a time slot of zero duration. The zero time slot duration can indicate to the targeted client device 114 that the request message was received, but no slots are available. The client device 114 can then wait for a subsequent response containing a non-zero time-slot duration. The link control element 625 of the device coordinator 600 shown in FIG. 6 can perform the acts of block 815.

Subsequent to determining the time-slot duration and location in future superframes, the process 800 continues at block 820 where a response message is transmitted to the requesting device. The response message is encoded with the time slot information determined at block 815. The time slot information may include one or more reserved CTB time slots within the superframe CTB frame 515 (see FIG. 5). The reserved CTB time slots may include an uplink CTB for the requesting device to transmit messages to the device coordinator 112 or to another client device 114. The reserved CTB time slots may include a downlink for the device coordinator 112 or another client device 114 to transmit messages to the requesting client device 114. The reserved CTB time slot may include a combined uplink/downlink time slot for asynchronous communication between the requesting device and the device coordinator 112 or another client device 114. Multiple reserved CTB time slots may be reserved for a single client device 114 within a single CTB frame 515 of a superframe 500. The time slot information may also include a start time and/or a termination time (e.g., a number of superframes for which the reserved CTB time slot is available). The response message also contains device address information that identifies the device or devices for which the uplink and/or downlink time-slots apply.

In some embodiments, the response message transmitted at block 820 is transmitted during a beacon frame period 505 of a superframe 500, as shown in FIG. 5. The response message may be one of a plurality of response messages containing time-slot information targeted for multiple client devices. The plurality of response messages may be combined/aggregated into a single beacon frame 505. The transmitter element 620 of the device coordinator 600 shown in FIG. 6 can perform the acts of block 820.

Thus the process 800 provides an efficient method for a device coordinator to receive contention based messages, at block 805, from a plurality of client devices 114. Since only the control initiation request message is contention based, in some embodiments, the contention based messages are kept to a minimum size. Since the contention based messages are kept to a minimum size, the odds of collision in the control frame 510 may be reduced and the duration of the control frame 510 may be reduced accordingly. By scheduling all other message exchanges over the low-rate channel, collisions may be avoided. Thus the time spent using the low-rate channel (or channels) can be used efficiently and more time can be reserved for the high-rate channel. It should be noted that some of the blocks of the process 800 may be combined, omitted, rearranged or any combination thereof.

Figure 9:
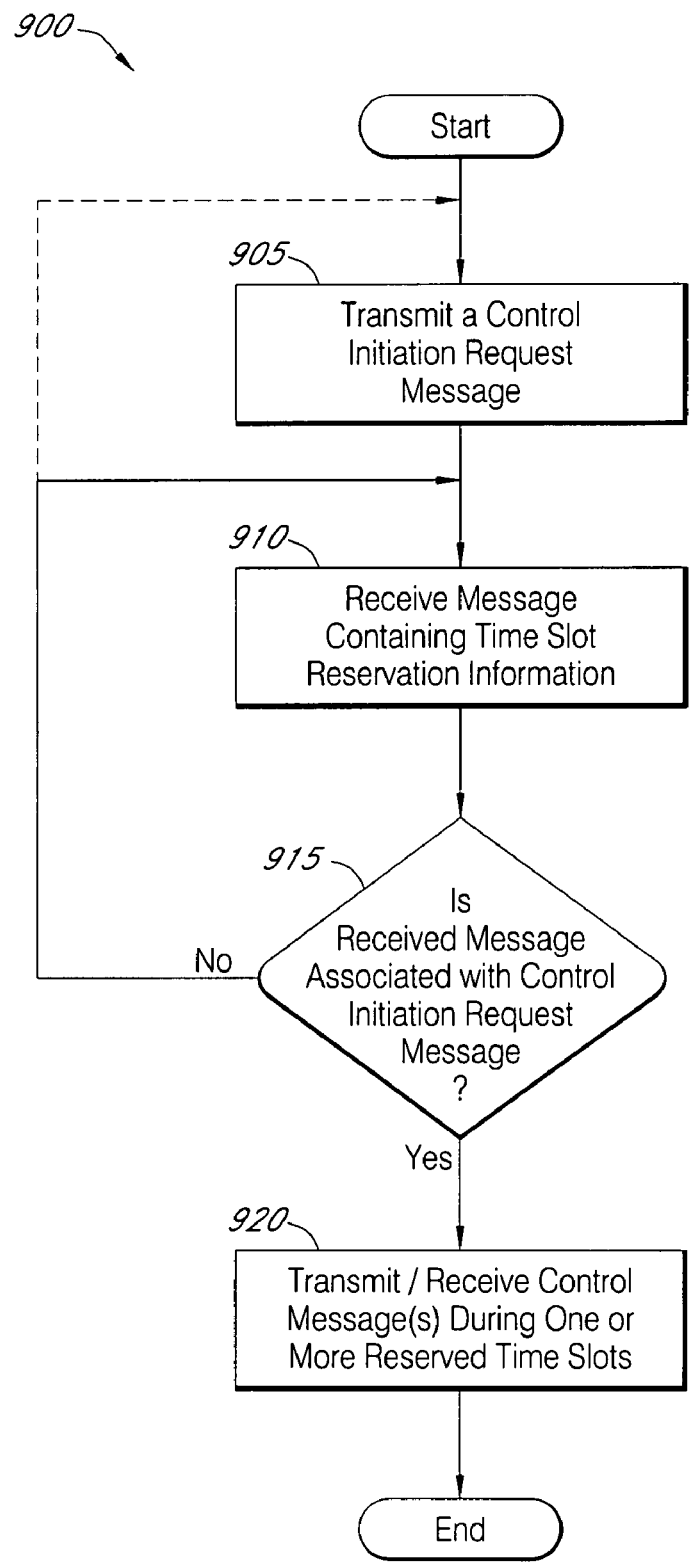
FIG. 9 is a flowchart illustrating an example of another method of performing medium access control in a wireless network such as illustrated in FIG. 1.

FIG. 9 is a flowchart illustrating an example of another method of performing medium access control in a wireless network such as illustrated in FIG. 1. Method 900 includes medium access control functions that are performed by a client device such as the client devices 114 in FIG. 1. The method 900 enables the client device 112 to request reserved time on the low-rate channel in an efficient manner. By keeping collisions that may occur during contention based access of the low-rate channel to a low level, the throughput on the high-rate channel, which cannot be utilized when the one or more low-rate channels are being utilized, can be improved.

The method 900 starts at block 905 where a control initiation request message is transmitted by the client device 114. Note, in a network where multiple coordinators may be present (e.g., a second coordinator may control a sub-network of a main network), a device coordinator may perform the process 900 as a client device to the other device coordinator. The control initiation request message is transmitted over the low rate channel. The control initiation request message can be transmitted during the control frame 510 of the superframe 500 as shown in FIG. 5a. The control frame 510 may be a contention based control period where multiple client devices 114 can transmit control initiation request messages and a collision of multiple messages is possible. The control initiation request message may also be transmitted in an unreserved CTB period of the CTB frame 515 in the superframe 500. The control initiation request message contains information identifying the client device 114 that is requesting the control message exchange. The control initiation request message may also contain information identifying a second device (such as the device coordinator 112 or another client device 114) that the requesting device is requesting to have the message exchange with. The transmitter element 720 of the client device 700 shown in FIG. 7 can perform the acts at the block 805.

In some embodiments, as discussed above, the control initiation request message contains information identifying the type of control message exchange sequence that is being requested. The type of control message exchange sequence may be one of a plurality of message sequences including, but not limited to, network/device association and disassociation, device discovery, time slot reservations, device capability and preference exchanges. The information identifying the requested message exchange sequence may also identify a data rate, a length of time for transmission and/or reception of data, a minimum or maximum time, a minimum or maximum data rate, as well as other types of information known to those of skill in the art that could enable a device coordinator to accurately predict the time slot duration and/or the number of superframe periods needed to support the requested message exchange. This method of allocating time slots to operations of predictable data content and time duration can result in message exchanges being completed in a fixed and predictable time while reducing channel overhead due to reduced collision probability. The medium access control element 725 of the device coordinator 700 shown in FIG. 7 can determine the information content of the control initiation request message.

Subsequent to transmitting the control initiation request message at block 905, the process 900 continues at block 910 where a response message is received by the requesting device. The response message may be transmitted by a device coordinator 112 using the method 800 shown in FIG. 8 and discussed above. The response message is encoded with the time slot information such as determined by the device coordinator 112 at block 815 of the process 800. The time slot information may include one or more reserved CTB time slots within the superframe CTB frame 515 (see FIG. 5). The reserved CTB time slots may include an uplink CTB for the requesting device to transmit messages to the device coordinator 112 or to another client device 114. The reserved CTB time slots may include a downlink for the requesting device to receive messages from the device coordinator 112 or another client device 114. The reserved CTB time slot may include a combined uplink/downlink time slot for asynchronous communication between the requesting device and the device coordinator 112 or another client device 114. Multiple reserved CTB time slots may be reserved for a single client device 114 within a single CTB frame 515 of a superframe 500. The time slot information may also include a start time and/or a termination time (e.g., a number of superframes for which the reserved CTB time slot is available). The response message also contains device address information that identifies the device or devices for which the uplink and/or downlink time-slots apply.

In some embodiments, the response message received at block 910 is received during a beacon frame period 505 of a superframe 500, as shown in FIG. 5. The response message may be one of a plurality of response messages containing time-slot information targeted for multiple client devices 114. The plurality of response messages may be combined or aggregated into a single beacon frame 505. The receiver element 715 of the client device 700 shown in FIG. 7 can perform the acts of block 910.

Since response messages may be targeted to multiple client devices 114, the process 900 continues at decision block 915 where the client device 114 determines if the response message received at block 910 is associated with the control initiation request message transmitted by the client device 114 at block 905. As discussed above, the response message received at block 910 contains device address information identifying the device or devices which the response message is targeted for. If the device address information contained in the response message matches the device address of the client device 114 performing the process 900, then it can be determined that the message is in response to the control initiation request message previously transmitted at block 905.

If it is determined, at block 915, that the response message is not associated with the transmitted control initiation request message, the process 900 returns to block 910 where the client device waits to receive another response message. Optionally, the process 900 may return to block 905 (as indicated by the dashed arrow) where another control initiation request message is transmitted. The return to block 905 may be triggered based on a default elapsed time. In this way, if the device coordinator never received the message, e.g., due to a collision of messages during the control frame 505, the client device retransmits the request until the device coordinator receives it. If it is determined, at block 915, that the response message is associated with the control initiation request message transmitted at block 905, the process 900 continues to block 920. In one embodiment, the time duration of the associated time slot is set to zero by the device coordinator (as discussed above) in order to indicate that the request message was received, but that not enough unreserved CTB time is available. In this case the process 900 returns to the block 910 to receive another response messages, knowing that the device coordinator successfully received the request message transmitted at the block 905 and will transmit another response message when sufficient unreserved CTB time is available. The medium access control element 725 of the client device 700 shown in FIG. 7 can perform the acts of the decision block 915.

At the block 920, the client device 114 transmits and/or receives messages during the reserved time slots identified in the response message that was determined to be associated with the transmitted control initiation request message. The transmitter element 720 and the receiver element 715 of the client device 700 shown in FIG. 7 can perform the transmit and receive acts of the block 920.

Thus the process 800 provides an efficient method for a client device 114 to transmit contention based messages requesting reserved time on the low-rate channel to conduct message exchanges with the device coordinator 112 or other client devices 114. Since only the control initiation request message is contention based, in some embodiments, the contention based messages are kept to a minimum size. Since the contention based messages are kept to a minimum size, the odds of collision in the control frame 510 may be reduced and the duration of the control frame 510 may be reduced accordingly. By scheduling all other message exchanges over the low-rate channel, collisions may be avoided. Thus the time spent using the low-rate channel (or channels) can be used efficiently and more time can be reserved for the high-rate channel. It should be noted that some of the blocks of the process 900 may be combined, omitted, rearranged or any combination thereof.

Figure 10:
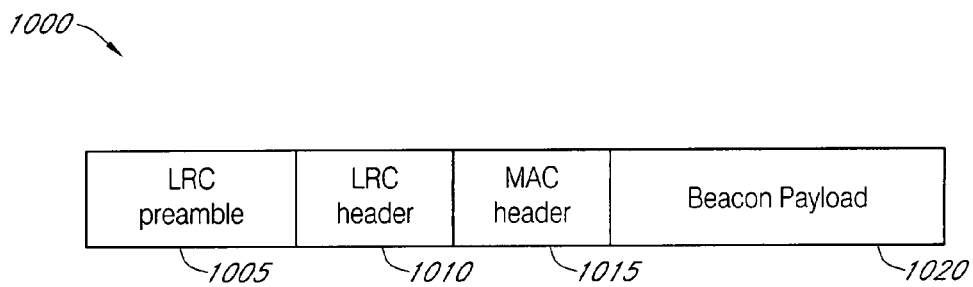
FIG. 10 is a diagram illustrating an embodiment of a beacon frame data packet for transmitting reserved time slot information.

FIG. 10 is an embodiment of a beacon frame data packet for transmitting reserved time slot information. The data packet 1000 can be transmitted by a device coordinator as the response message at block 820 of the process 800 shown in FIG. 8. The data packet 1000 comprises an LRC preamble field 1005, an LRC header field 1010 a MAC header field 1015 and a beacon payload field 1020. The LRC (low-rate channel) preamble field 1005 contains a predetermined sequence of signals that are used to aid in identification of the start of the message. The LRC preamble field 1005 may contain a plurality of signal fields that may be used by the receiving device for frequency synchronization and symbol rate adjustment. The LRC header 1010 contains information such as the length of the MAC header and beacon payload fields. The MAC header field 1015 contains information such as source address, destination address, header checksum and others known to those of skill in the art. The destination address is used by the client device 114 to determine, at the decision block 915 of the process 900 in FIG. 8, if the beacon payload contains information elements (IEs) such as the time slot information associated with a control initiation request. The beacon payload field 1020 contains the time-slot information identifying the reserved CTB times in the superframe period for the uplink and/or downlinks required by the requested message sequence. In addition to the time slot information, the beacon payload field 1020 may also contain information identifying the duration of the beacon frame 505 and/or the control frame 510, as well as information identifying whether there is unreserved time available in the superframe to accept new bandwidth reservations or to allow devices to contend for the channel.

Figure 11:
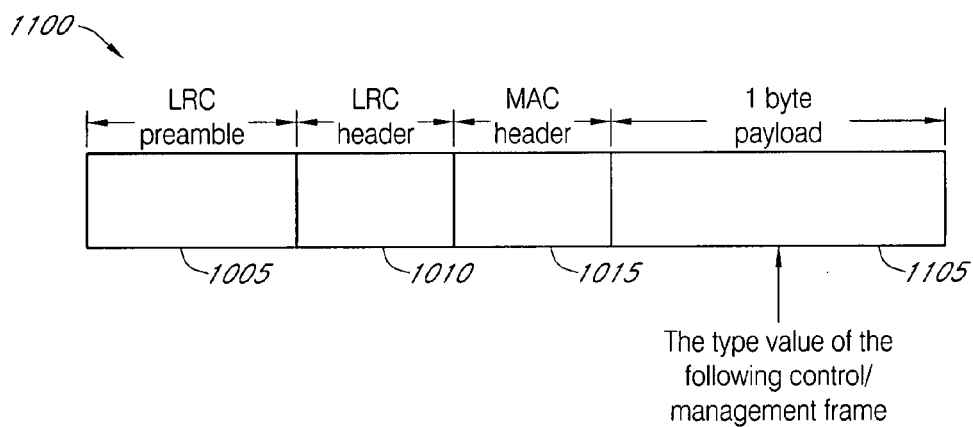
FIG. 11 is a diagram illustrating an embodiment of a control initiation request message data packet.
Figure 12:
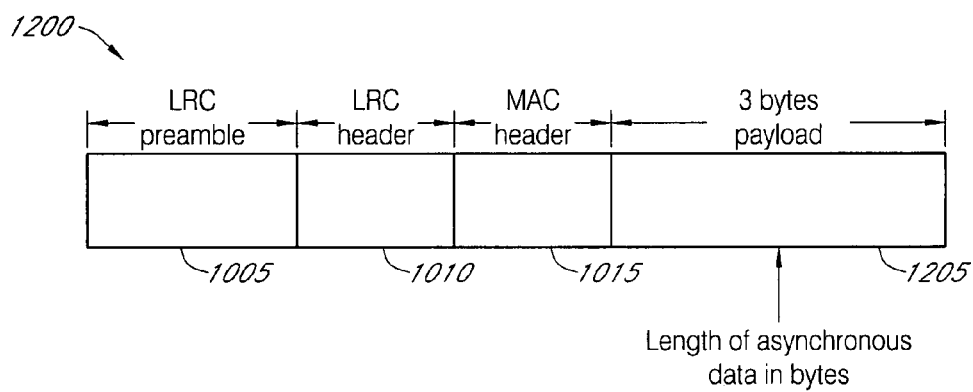
FIG. 12 is a diagram illustrating another embodiment of a control initiation request message data packet.

FIG. 11 is an embodiment of a control initiation request message data packet. FIG. 12 is another embodiment of a control initiation request message data packet. The LRC preamble field 1005, the LRC header field 1010 and the MAC header field 1015 of data packets 1100 and 1200 may be the same as these corresponding fields in the data packet 1000 shown in FIG. 10. The message type field 1105 of the data packet 1100 is an 8-bit (I byte) field used to identify the type of message sequence that is being requested, as discussed above in reference to the block 810 of the process 800 in FIG. 8. The 8-bit length of the message type field 1105 is only an example. The packet 1200 includes a three byte (24 bit) payload that can be used to identify an amount of data (e.g., in bytes) that is to be exchanged in the reserved low-rate time slot that is being requested by the control initiation request message data packet 1200. Again, the three byte payload length is an example and other lengths may be used. The data packets 1100 and 1200 are examples of control initiation request message formats that may be transmitted by a client device 114 at the block 905 of the process 900 in FIG. 9.

An embodiment of an apparatus for performing medium access control in a system for wireless communication of uncompressed video, wherein the system comprises a high rate channel and a low rate channel is provided. The apparatus of this embodiment includes means for receiving a control initiation request message over the low rate channel from a client device, means for determining at least one time slot for communication of control messages associated with the client device within a superframe period of a predetermined length, and means for transmitting a message over the low rate channel containing information identifying the at least one determined time slot. With reference to FIG. 6, aspects of this embodiment include where the receiving means is the receiver element 615, where the determining means is the link control element 625 and where the transmitting means is the transmitter element 620.

An embodiment of an apparatus for performing medium access control in a system for wireless communication of uncompressed video, where the system comprises a high rate channel and a low rate channel is provided. The apparatus of this embodiment includes means for transmitting a control initiation request message over the low rate channel, means for receiving a plurality of messages over the low rate channel, and means for determining that one of the received messages is a response message associated with the initiation request message, the response message containing information identifying at least one reserved time slot within a superframe period, the superframe period being of a predetermined length, where the means for transmitting transmits and/or the means for receiving receives a control message during the at least one identified time slot of one or more subsequent superframe periods. With reference to FIG. 7, aspects of this embodiment include where the transmitting means is the transmitter element 720, where the receiving means is the receiver element 715, and where the determining means is the medium access control element 725.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A method of performing medium access control in a system for wireless communication of uncompressed video, wherein the system comprises a high rate channel and a low rate channel having a lower transmission rate than the high rate channel, the method comprising:

receiving a control initiation request message over the low rate channel from a client device during a contention based period;

determining at least one time slot to be reserved for contention-free transmission of control messages to or from the client device within a superframe period of a predetermined length in response to the control initiation request message, wherein determining at least one time slot includes determining a time slot duration, wherein the duration of each time slot is determined based on identifying a type of control message exchange sequence contained in the control initiation request message; and transmitting a message over the low rate channel containing information identifying the at least one determined time slot, wherein the low rate channel provides both contention-based transmission and contention-free transmission, wherein uncompressed video is transmitted over the high rate channel rather than the low rate channel.

2. The method of claim 1, wherein frequency bands of the low rate channel and the high rate channel at least partially overlap.

3. The method of claim 1, wherein the low rate channel and the high rate channel use TDD (Time Division Duplexing).

4. The method of claim 1, wherein the control initiation request is received during a contention based control period of the superframe period.

5. The method of claim 1, further comprising transmitting a beacon message during a predetermined portion of the superframe period, wherein the beacon message contains time slot information for one or more client devices.

6. The method of claim 5, further comprising transmitting one or more control messages during the predetermined portion of the superframe period.

7. The method of claim 1, wherein the control initiation request message comprises a preamble, a header and information identifying the control messages to be communicated during the determined time slot.

8. The method of claim 7, further comprising estimating a time to complete communication of the control messages based on the identifying information contained in the control initiation request message.

9. The method of claim 1, wherein determining the at least one time slot comprises determining a first time slot for the client device to transmit control messages and determining a second time slot for the client device to receive control messages.

10. A system for performing medium access control in a network for wireless communication of uncompressed video, wherein the network comprises a high rate channel and a low rate channel having a lower transmission rate than the high rate channel, the system comprising:
    a receiver to receive a control initiation request message over the low rate channel from a client device during a contention based period;
    a link controller to determine at least one time slot to be reserved for contention-free transmission of control messages associated with the client device within a superframe period of a predetermined length in response to the control initiation request message, wherein determining at least one time slot includes determining a time slot duration, wherein the duration of each time slot is determined based on identifying a type of control message exchange sequence contained in the control initiation request message; and
    a transmitter to transmit a message over the low rate channel containing information identifying the at least one determined time slot,
    wherein the low rate channel provides both contention-based transmission and contention-free transmission, wherein uncompressed video is transmitted over the high rate channel rather than the low rate channel.

11. The system of claim 10, wherein frequency bands of the low rate channel and the high rate channel at least partially overlap.

12. The system of claim 10, wherein the low rate channel and the high rate channel use TDD (Time Division Duplexing).

13. The system of claim 10, wherein the control initiation request is received during a contention based control period of the superframe period.

14. The system of claim 10, wherein the transmitter is further configured to transmit a beacon message during a predetermined portion of the superframe period, wherein the beacon message contains time slot information for one or more client devices.

15. The system of claim 14, wherein the transmitter is further configured to transmit one or more control messages during the predetermined portion of the superframe period.

16. The system of claim 10, wherein the control initiation request message comprises a preamble, a header and information identifying the control messages to be communicated during the at least one determined time slot.

17. The system of claim 16, wherein the link controller is further configured to estimate a time to complete communication of the control messages based on the identifying information contained in the control initiation request message.

18. The system of claim 10, wherein the link controller determines a first time slot for the client device to transmit control messages and determines a second time slot for the client device to receive control messages.

19. A system for performing medium access control in a network for wireless communication of uncompressed video, wherein the network comprises a high rate channel and a low rate channel, the system comprising:
    means for receiving a control initiation request message over the low rate channel from a client device during a contention based period;
    means for determining at least one time slot to be reserved for contention-free transmission of control messages associated with the client device within a superframe period of a predetermined length in response to the control initiation request message, wherein determining at least one time slot includes determining a time slot duration, wherein the duration of each time slot is determined base on identifying a type of control message exchange sequence contained in the control initiation request message; and
    means for transmitting a message over the low rate channel containing information identifying the at least one determined time slot,
    wherein the low rate channel provides both contention-based transmission and contention-free transmission, wherein uncompressed video is transmitted over the high rate channel rather than the low rate channel.

20. A method of performing medium access control in a system for wireless communication of uncompressed video, wherein the system comprises a high rate channel and a low rate channel having a lower transmission rate that the high rate channel, the method comprising:
    transmitting a control initiation request message over the low rate channel during a contention based period;
    receiving a plurality of messages over the low rate channel;
    determining that one of the received messages is a response message associated with the transmitted control initiation request message, the response message containing information identifying at least one reserved time slot reserved for contention-free transmission to or from the client device within a superframe period, the superframe period being of a predetermined length; determining a duration of each of the at least one reserved time slot based on an identified type of control message exchange sequence contained in the control initiation request message; and
    transmitting and/or receiving a control message over the low rate channel during the at least one identified time slot of one or more subsequent superframe periods,
    wherein the low rate channel provides both contention-based transmission and contention-free transmission, wherein uncompressed video is transmitted over the high rate channel rather than the low rate channel.

21. The method of claim 20, wherein frequency bands of the low rate channel and the high rate channel at least partially overlap.

22. The method of claim 20, wherein the low rate channel and the high rate channel use TDD (Time Division Duplexing).

23. The method of claim 20, further comprising transmitting the control initiation request during a contention based control period of the superframe period.

24. The method of claim 20, further comprising retransmitting the control initiation request message over the low rate channel in a subsequent superframe period in response to determining that the response message has not been received.

25. The method of claim 20, wherein the control initiation request message comprises information identifying a type of control message sequence to be communicated during the at least one reserved time slot.

26. A system for performing medium access control in a network for wireless communication of uncompressed video, wherein the network comprises a high rate channel and a low rate channel having a lower transmission rate than the high rate channel, the system comprising:
- a transmitter to transmit a control initiation request message over the low rate channel;
- a receiver to receive a plurality of messages over the low rate channel; and
- a medium access controller configured to determine that one of the received messages is a response message associated with the transmitted control initiation request message, the response message containing information identifying at least one reserved time slot within a superframe period, the superframe period being of a predetermined length, wherein the medium access controller determines the duration of the at least one time slot based on an identified type of control message exchange sequence contained in the control initiation request message;

wherein the transmitter transmits and/or the receiver receives a control message over the low rate channel during the at least one identified time slot of one or more subsequent superframe periods, wherein the low rate channel provides both contention-based transmission and contention-free transmission, wherein uncompressed video is transmitted over the high rate channel rather than the low rate channel.

27. The system of claim 26, wherein frequency bands of the low rate channel and the high rate channel at least partially overlap.

28. The system of claim 26 wherein the low rate channel and the high rate channel use TDD (Time Division Duplexing).

29. The system of claim 26, wherein the transmitter is further configured to transmit the control initiation request during a contention based control period of the superframe period.

30. The system of claim 26, wherein the transmitter is further configured to retransmit the control initiation request message over the low rate channel in a subsequent superframe period in response to determining that the response message has not been received.

31. The system of claim 26, wherein the control initiation request message comprises information identifying a type of control message sequence to be communicated during the at least one reserved time slot.

32. A system for performing medium access control in a network for wireless communication of uncompressed video, wherein the network comprises a high rate channel and a low rate channel having a lower transmission rate than the high rate channel, the system comprising:
- means for transmitting a control initiation request message over the low rate channel during a contention based period;
- means for receiving a plurality of messages over the low rate channel;
- means for determining that one of the received messages is a response message associated with the transmitted control initiation request message, the response message containing information identifying at least one reserved time slot within a superframe period, the superframe period being of a predetermined length; means for determining time slot duration based on identifying a type of control message exchange sequence contained in the control initiation request message; and wherein the means for transmitting transmits and/or the means for receiving receives a control message over the low rate channel during the at least one identified time slot of one or more subsequent superframe periods, wherein the low rate channel provides both contention-based transmission and contention-free transmission, wherein uncompressed video is transmitted over the high rate channel rather than the low rate channel.

33. A system for communicating uncompressed video data over a wireless communication link, the wireless communication link including a high rate channel associated with a bandwidth capable of supporting transmission of the uncompressed video data, and a low rate channel associated with a bandwidth smaller than the bandwidth of the high rate channel, wherein frequency bands of the low rate channel and the high rate channel at least partially overlap, wherein the low rate channel has a lower transmission rate than the high rate channel, the system comprising:
- a device coordinator comprising:
  - a receiver to receive a control initiation request message over the low rate channel during a contention based first period of a superframe period of a predetermined length,
  - a link controller to determine a time slot within a second portion of the superframe period to be reserved for contention-free transmission of control messages over the low rate channel in response to the control initiation request message, wherein determining at least one time slot includes determining a time slot duration, wherein the duration of each time slot is determined based on identifying a type of control message exchange sequence contained in the control initiation request message; and
  - a transmitter to transmit a response message over the low rate channel containing information identifying the determined time slot; and
- a client device comprising:
  - a transmitter to transmit the control initiation request message over the low rate channel, and
  - a receiver to monitor the low rate channel and to receive the response message, wherein the transmitter is further configured to transmit a control message over the low rate channel during the identified time slot of one or more subsequent superframes in response to receiving the response message containing the reserved time slot information, wherein the low rate channel provides both contention-based transmission and contention-free transmission, wherein uncompressed video is transmitted over the high rate channel rather than the low rate channel.

34. A method of performing medium access control in a system for wireless communication comprising a device coordinator and a plurality of client devices having a lower transmission rate than the high rate channel, the method comprising:
- receiving a control initiation request message over the low rate channel from a client device during a contention based period;
- determining at least one time slot reserved for contention-free communication by the client device based at least in part on the control initiation request message, wherein determining at least one time slot includes determining a time slot duration, wherein the duration of each time slot is determined based on identifying a type of control message exchange sequence contained in the control initiation request message;

transmitting a message over the low rate channel containing information identifying the at least one determined time slot; and transmitting or receiving, at the client device, at least one control message over the low rate channel during the at least one determined time slot.

35. The method of claim 1, wherein the high rate channel and the low rate channel have different frequency bands.

36. The method of claim 1, wherein the type of control message exchange sequence comprises one of: network association and disassociation, device association and disassociation, device discovery, time slot reservations, device capability, and preference exchanges.

37. The method of claim 36, wherein information identifying a requested message exchange sequence also identifies one of: a data rate, a length of time for transmission and reception, a length of time for transmission, a length of time for reception, a minimum data rate, and a maximum data rate.

38. The method of claim 1, wherein the high-rate channel cannot be used while the low-rate channel is being used.

39. The method of claim 1, wherein determining the time slot is based on predicted time slot durations determined based on predicted data content of message exchange sequences, wherein the predicted time slot durations are stored in a look-up table.

* * * * *